United States Patent [19]

Myer

[11] Patent Number: 5,052,782
[45] Date of Patent: Oct. 1, 1991

[54] RESILIENT LENS MOUNTING APPARATUS

[75] Inventor: Jon H. Myer, Woodland Hills, Calif.

[73] Assignee: Hughes Aircraft Company, Los Angeles, Calif.

[21] Appl. No.: 323,532

[22] Filed: Mar. 14, 1989

[51] Int. Cl.$^5$ .................. G02B 7/02; G02B 21/00; G02B 15/00

[52] U.S. Cl. .................. 359/827; 359/819; 359/830; 359/900; 359/694

[58] Field of Search .................. 350/252–257, 350/245, 248, 429, 320; 267/166–180; 277/97–100, 152, 153; 285/318–319

[56] References Cited

U.S. PATENT DOCUMENTS

| | | | |
|---|---|---|---|
| 3,468,527 | 9/1969 | Mather | 267/167 |
| 3,927,252 | 12/1975 | Polley | 350/255 |
| 3,966,183 | 6/1976 | Mayer, Sr. | 267/167 |
| 4,525,745 | 6/1985 | Ghaem-Maghami et al. | 350/253 |
| 4,553,545 | 11/1985 | Maass et al. | 267/167 |
| 4,655,462 | 4/1987 | Balsells | 267/167 |
| 4,678,210 | 7/1987 | Balsells | 285/318 |
| 4,707,083 | 11/1987 | Iizuka et al. | 350/429 |
| 4,805,943 | 2/1989 | Balsells | 285/318 |

FOREIGN PATENT DOCUMENTS 147901  6/1985  Fed. Rep. of Germany ...... 350/252

Primary Examiner—Bruce Y. Arnold
Assistant Examiner—Thong Nguyen
Attorney, Agent, or Firm—Leonard A. Alkov; Wanda Denson-Low

[57] ABSTRACT

Lens barrel (12) has a shoulder (16) therein and a retaining ring to retain lens (20) within the lens barrel. A canted coil spring member (24) is engaged between the retaining ring and lens to resiliently retain the lens in place against thermal cycling, vibration and shock.

17 Claims, 2 Drawing Sheets

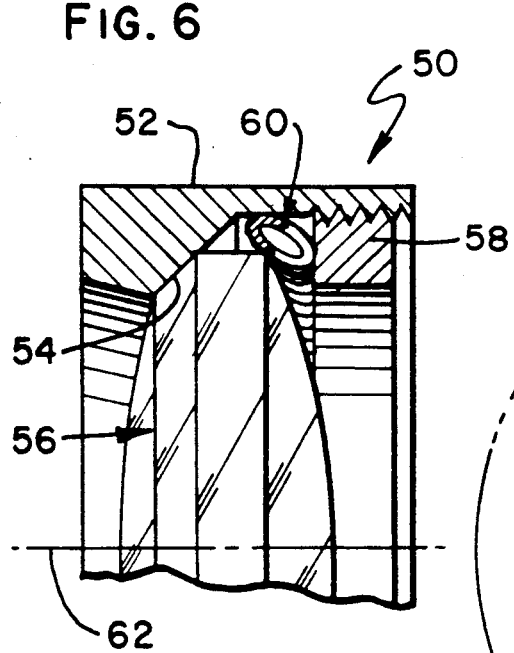
FIG. 6
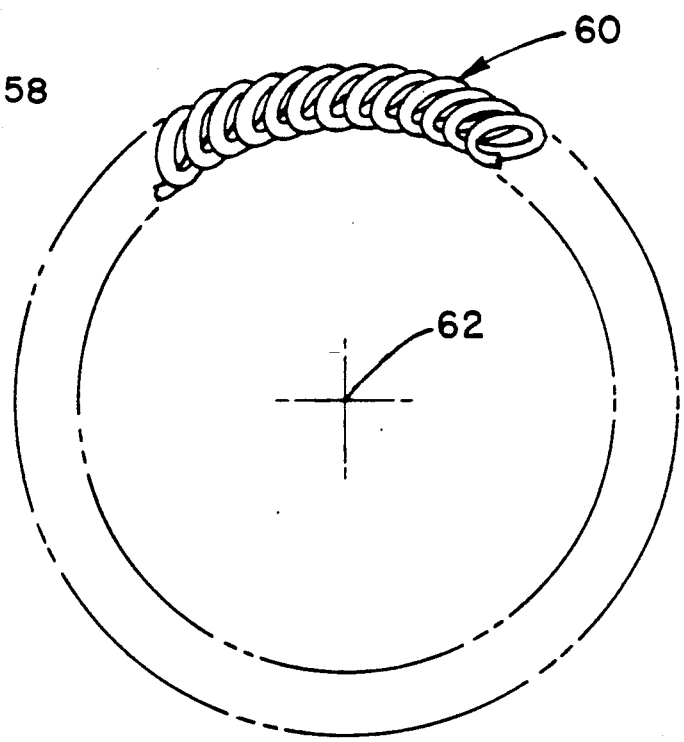
FIG. 7
FIG. 8
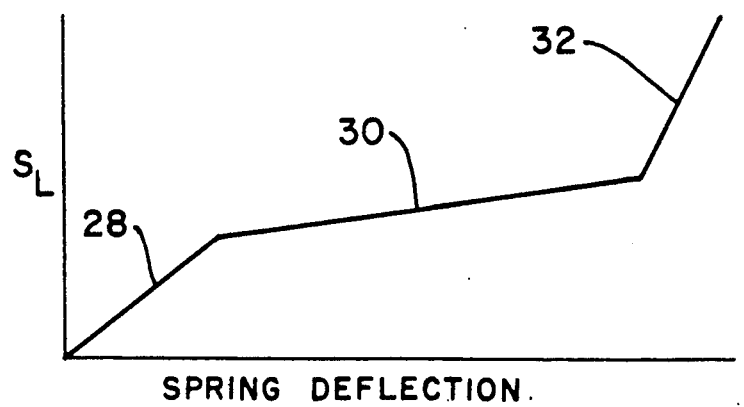
SPRING DEFLECTION.

RESILIENT LENS MOUNTING APPARATUS

FIELD OF THE INVENTION

This invention is directed to a resilient lens mounting apparatus in the form of a canted coil spring for axially and/or radially retaining an optical element in its structural mounting.

BACKGROUND OF THE INVENTION

Prior optical element installation devices have ranged from adhesive bonding of the lens in its barrel or mounting tube to precision machined contoured and threaded retaining rings which engage in the lens mounting barrel and against the lens. Considering the centerline line-of-sight as being the lens axis, there have been various ways of axially securing a lens in a barrel. For example, the lens may engage against a rigid shoulder in the lens barrel and be retained thereagainst by different structures. For example, a snap ring can engage in a groove in the barrel and engage against the lens to hold it against a shoulder. A thin rim may be spun down against the lens to hold it against a shoulder. A male threaded ring may engage a female thread within the barrel and directly bear against the lens to hold it against a shoulder. When resiliency is desired, an elastomeric ring, such as an elastomeric O-ring, made of rubberlike material, can be placed between the lens and its clamp ring.

For radially centering the lens within its support barrel, an elastic material in the form of a ring may provide the necessary support. This elastic material may be molded and placed around the lens or may be injected around the lens after it is in position.

The problem in precision lens mounting is that the lenses or other optical elements have a substantially different thermal coefficient of expansion than the metal or polymer barrel in which they are mounted. When temperature cycling occurs, the lenses and other optical elements may shift and lose their optical alignment. Rigid structures are desirable to achieve and maintain this optical alignment, but the compressive forces generated by such temperature cycling dictate against rigid mounting because brittle optical elements can crack from the stresses resulting from temperature-induced dimensional changes. Shock and vibration tend to displace optical components, so firm mounting is required. Thus, there is need for a lens mounting configuration which maintains axial and radial alignment of the optical elements mounted thereby during vibration and thermal dimensional changes in order to provide a rugged optical system of good precision and long life.

SUMMARY OF THE INVENTION

In order to aid in the understanding of this invention, it can be stated in essentially summary form that it is directed to a resilient lens mounting apparatus wherein a coil spring is employed in a lens mounting structure in order to provide axial and/or radial positioning forces for holding the lens in place. The coiled spring has its loops canted in such a direction as to enhance the resiliency of the spring in the direction in which force is applied.

It is thus a purpose and advantage of this invention to provide a resilient lens mounting apparatus which employs a canted coil spring so as to resiliently urge an optical element into its mounting so that the optical element maintains its optical positional alignment during stressful conditions such as vibration or temperature changes.

It is another purpose and advantage of this invention to provide a resilient lens mounting apparatus which incorporates a canted coil spring as the resilient element so as to provide a more nearly constant force resiliency, as compared to an ordinary coil spring and other resilient mountings.

Yet another purpose and advantage of the present invention is to provide a resilient lens mounting apparatus which does not change or deteriorate with time as compared to synthetic elastomeric structures.

Other purposes and advantages of this invention will become apparent from a study of the following portion of this specification, the claims and the attached drawings wherein:

BRIEF DESCRIPTION OF THE DRAWINGS

FIG. 6 is a side elevational view of the third preferred embodiment of the resilient lens mounting apparatus of this invention, with parts broken away and parts taken on a radial section through the optical axis, showing a single canted coil spring applying both axial and radial positioning force onto an optical element within a lens barrel.

FIG. 7 is a plan view of the canted coil spring of FIG. 6.

FIG. 8 is a graph showing spring load versus spring deflection of a canted coil spring.

DESCRIPTION OF THE PREFERRED EMBODIMENTS

Figure 1:
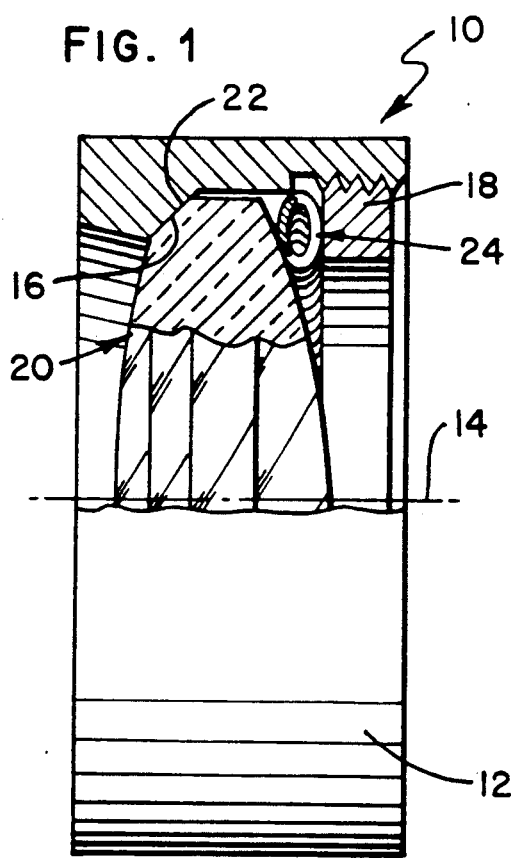
FIG. 1 is a side elevational view of the first preferred embodiment of the resilient lens mounting apparatus of this invention, with parts broken away and parts taken on substantially a radial section line for an apparatus which employs axial mounting force between the lens barrel and optical element.

The resilient lens mounting apparatus indicated at 10 in FIG. 1 is the first preferred embodiment of the apparatus of this invention. Lens barrel 12 is a structure of revolution about the axis 14. The lens barrel 12 has features thereon which permit the mounting of the lens in a precise location in the optical apparatus, with the axis 14 on the principal line-of-sight of the optical apparatus. The lens barrel 12 has a shoulder 16 therein which is substantially a cone around the axis of revolution. Lock ring 18 is threaded into the lens barrel. It can be removed and tightened therein for the placement and removal of a lens within the lens barrel.

While locking rings are shown as being threaded into the lens barrel, other securing means can be employed for effecting closure. For example, as an alternative to the threaded locking ring, a snap ring can engage in a snap ring groove. Either the snap ring or a washer thereunder can engage against the resilient member. For a permanent installation, a rim can be spun or swaged over to hold the resilient member in place.

Lens 20 is an example of an optical element. The lens 20 is a double convex spherical lens with its optical and physical axis on the axis 14. The lens has a conical surface 22 or curved lens surface which engages against the shoulder 16. Resilient member 24 is engaged between lock ring 18 and lens 20, to force the lens against the conical shoulder 16. The resiliency of the member 24 provides the compliance which permits lens 20 and/or its mounting apparatus to change dimensions without overstressing the mounting apparatus or the lens and maintain the lens against its shoulder during vibration shock loading and temperature cycling. Of course, the resilient member could be installed between the lens and the shoulder.

Figure 2:
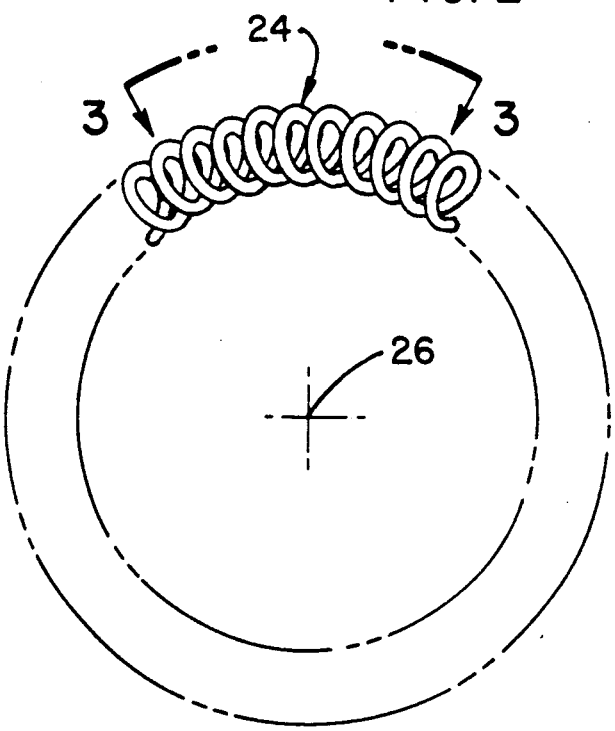
FIG. 2 is a plan view of the resilient canted coil spring employed in the apparatus of FIG. 1.
Figure 3:
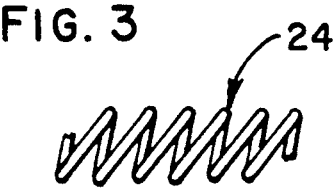
FIG. 3 is a side elevational view of the canted coil spring, as seen generally along the line 3—3 of FIG. 2.

Resilient member 24 is shown in FIGS. 1 and 2 as being in the form of a series of loops of a coil spring formed into a circle. The series of loops is coiled of resilient material such as hard metallic wire which is coiled into loops in a traditional spiral spring configuration, and then the spiral spring is shaped into a circle with its ends secured to make a continuous circle. The loops are canted. As seen in FIGS. 2 and 3, the loops of the spiral spring are axially canted so that each of the loops of the spiral spring lies over at an acute angle with respect to the center line axis of the circle. The direction of cant of the loops in FIG. 2 is such that the plane of each canted loop lies at an angle to the center line 26, but intersects with the center line. This reduces the thickness dimension in the direction of the axis 14, but this reduction in thickness is not making the spiral loops oval, but it overlaps and cants the individual loops of the spiral spring. Considering the mandrel center line upon which the spiral spring could be originally wound, the cant is in a direction so that the plane of each loop is not normal to the mandrel center line, but is tilted at an acute angle with respect to the center line of the mandrel. Furthermore, these tilts are arranged so that each of the canted coils lies in a plane which substantially intersects the axis 26 at the center of the spring loop shown in FIG. 2. In other words, the cant direction is such as to be operative in the axial direction of axis 14. When the lock ring 18 is screwed against the resilient member 24, the canted spiral spring loops deflect, not by bending of the individual circular spring loops into an oval configuration, but by substantially tilting the canted direction of the individual loops. Thus, the resilient action of the canted coil spring is by twisting of the spring wire rather than compressing the round loops of spring wire into an oval configuration, the resilient member with the canted coils applies urging force to the optical element by resiliently moving toward the uncanted position. In the embodiment illustrated in FIG. 1, the loops of the resilient member are canted so as to axially urge the lens against its shoulder as the canted loops resiliently move toward their uncanted position. It is to be noted that the canted coil spring is preferably in the configuration of a complete circle as shown in FIG. 2. However, for some applications, it may not be necessary to join the ends of the circle so that the resilient member is an open canted coil spring circle with two ends which, when inserted in place, will have two adjacent ends rather than joined ones.

The advantage of the canted coil construction is seen in FIG. 8 where the axial spring loading force is plotted against spring deflection. When load is initially applied, spring deflection rises along a relatively steep line 28 until the canted loops are laid over a bit to reduce the upright character of parts of the coil, which are seen in FIG. 3. After the canted loops are partially laid over, the spring rate is lower, as represented by the deflection line 30, which is the preferred range of operation of the canted coil spring. When increasing load and continuing deflection, the canted loops finally tilt over so far that they contact each other. At this point, the deflection line 32 rises more sharply. Thus, the desired operating range of the resilient canted coil spring 24 is in the middle range. This range provides a suitably unchanging spring rate over a wide range of applied forces so that the retaining force applied by the resilient member 24 is fairly constant over the operative range.

Figure 4:
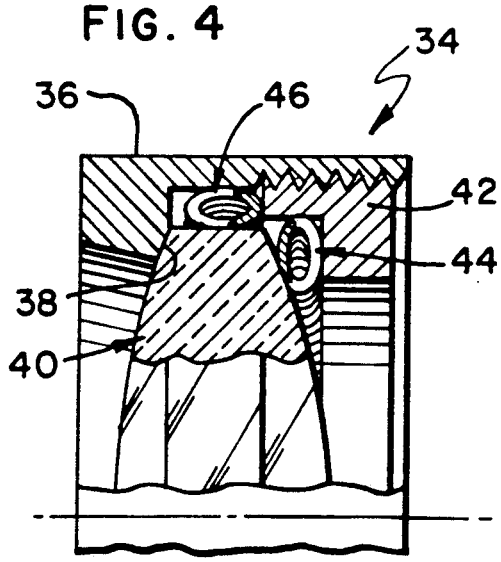
FIG. 4 is a side elevational view of a second preferred embodiment of the resilient lens mounting apparatus of this invention, with parts broken away on a substantially radial plane through the optical axis showing separate canted coil springs to apply axial and radial positioning force on the optical element with respect to the lens barrel.

The second preferred embodiment of the resilient lens mounting apparatus of this invention is generally indicated at 34 in FIG. 4. The resilient lens mounting apparatus is mounted in lens barrel 36, which has a shoulder 38 against which the lens 40 lies. The lens 40 is an example of an optical element, and other optical elements could be mounted in this way. Lock ring 42 is treadedly engaged in the lens barrel. A recess is provided in the lock ring to radially and axially restrain resilient member 44, which is a coil spring with canted loops, the same as member 24. The canted loops of the member 44 are canted in the axial direction of the optical axis. The member 44 axially engages against the lens 40 to apply resilient axially positioning force on the lens to hold it against its positioning shoulder 38.

Figure 5:
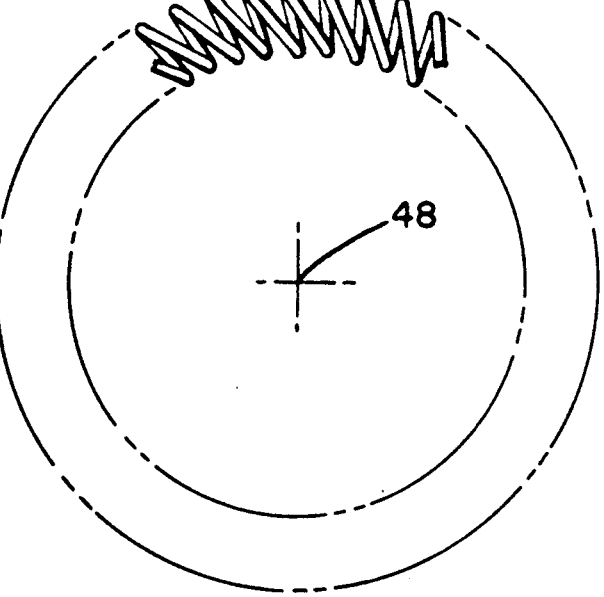
FIG. 5 is a plan view of the radial positioning canted coil spring of FIG. 4.

In order to apply resilient radially directed positioning force on the lens 40, resilient member 46 is positioned around the periphery of the lens 40. The resilient member 46 is another coil spring structure in which the loops are radially canted and which is preferably made of spring metallic wire. The coil spring 46 with canted loops is preferably formed as a continuous circle, as illustrated in FIG. 5. The center line of the radially canted coil circle is on center 48, which is the same as the axis of the lens and the lens barrel. As previously described with respect to the resilient member 24, the resilient members 44 and 46 may not be continuous closed circle springs, but may be discontinuous with the ends of each spring positioned closely so as to be forming a substantially closed circle. The difference in configuration of resilient member 46 is that the direction of the cant angle of the loops in the coil spring is such as to provide radial spring action within the lens barrel. This cant is such that the plane of each canted loop is normal to the plane of the closed circle of FIG. 5; that is, tilted so that the plane of the loop does not pass through the center line 48, but lies at an acute angle to the radius from the center line to that loop. The radially constraining resilient member 46 is placed in the space around lens 40 such that it is operating in the center range of its spring deflection so as to apply a radially positioning resilient force to the lens within its lens barrel.

The resilient lens mounting apparatus 50 shown in FIG. 6 is the third preferred embodiment of the apparatus. Lens barrel 52 has a shoulder 54 therein, and lens 56 lies against that shoulder. Again, the lens 56 is an example of an optical element. The lens barrel and lens have a center line axis. Lock ring 58 is threadedly engaged in the lens barrel to hold the lens in place. Resilient member 60 is engaged between the lens, lens barrel and lock ring to resiliently hold the lens 56 both radially and axially within the lens barrel. The resilient member 60 is also shown in FIG. 7, where it is illustrated as a continuous circle coil spring around a center line 62. A continuous circle is preferable, but in some installations a discontinuous circle, with two ends adjacent each other can be employed. The resilient member 60 is a coil spring with canted loops formed as a helically wound spring wire which has been canted with respect to the coil centerline. Considering only the winding centerline of the helical spring coil, the resilient members 24, 46 and 60 are canted so that the spring loops lie at an angle with respect to the helical center line. In the structure of FIG. 2, the loops of the canted coil spring are tilted axially in the direction of axis 24. In the case of the loops of resilient member 46, they are tilted radially. In the case of resilient member 60, they are tilted at an angle to the axis.

When installed as shown in FIG. 6, the resilient member 60 provides a combined resilient positioning of the lens in the lens barrel in both the axial and radial directions of the optical axis 62. In this way, resilient lens positioning is achieved in both the radial and axial directions of the optical axis with secure lens positioning through temperature cycling, shock and vibration.

The resilient member may be initially formed as a true helix looped around a center line, and then each turn of the helix is canted. Each loop of the canted coil projects a substantially circular image upon a plane lying on the angle of the cant. This canted plane lies at an acute angle with respect to the normal plane. When the canted coil spring is curved into a continuous spring circle, with its ends joined as shown in FIGS. 2, 5 and 7, or with its ends merely adjacent, the canted coil spring circle defines a new plane which is normal to the optical axis. The major axis of each of the loops may lie in this plane, as shown in FIGS. 1, 2 and 3, or may lie normal to the plane, as shown in FIG. 5. In the case of the member 46, the axis lies in the plane of the circularly configured canted coil spring. In the case of FIGS. 6 and 7, the axis lies at an acute angle with respect to the plane of the circular spring 66. In this configuration, the rotation of the canted coil loops around the major axis is at an acute angle, approximately 45 degrees, with respect to the optical axis.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A resilient lens mounting apparatus comprising:
   a lens barrel having a shoulder therein;
   a lens within said lens barrel and engaged against said shoulder to locate said lens with respect to said lens barrel;
   a lock ring within said lens barrel and engaged with said lens barrel on the opposite side of said lens from said shoulder; and
   a substantially circular coil spring having canted loops resiliently engaged with said lens to position said lens with respect to said barrel.

2. A resilient lens mounting apparatus comprising:
   a lens barrel having a shoulder therein;
   a lens within said lens barrel and engaged against said shoulder to locate said lens with respect to said lens barrel, said lens having an axis;
   a lock ring within said lens barrel and engaged with said lens barrel on the opposite side of said lens from said shoulder; and
   a substantially circular coil spring having canted loops resiliently engaged with said lens to position said lens with respect to said barrel, said canted loops being radially canted and positioned around said lens and within said lens barrel to radially position said lens with respect to said axis.

3. The resilient lens mounting apparatus of claim 2 wherein the canted loops of said coil spring each lie on a plane which is away from said axis.

4. The resilient lens mounting apparatus of claim 3 wherein said coil spring having canted loops is a first spring and further including a second coil spring having canted loops axially positioned between said lock ring and said lens to axially engage said lens and urge it against said shoulder in said lens barrel.

5. The resilient lens mounting apparatus of claim 4 wherein said axially positioned second coil spring having canted loops is formed substantially into a circle and said coil spring is radially positioned coaxially with respect to said lens axis.

6. A resilient lens mounting apparatus comprising:
   a lens barrel having a shoulder therein;
   a lens within said lens barrel and engaged against said shoulder to locate said lens with respect to said lens barrel;
   a lock ring within said lens barrel and engaged with said lens barrel on the opposite side of said lens from said shoulder; and
   a substantially circular coil spring having canted loops resiliently engaged with said lens to position said lens with respect to said barrel, said coil spring having canted loops being formed substantially into a circle and said coil spring is axially positioned between said lock ring and said lens to axially urge said lens against said shoulder.

7. The resilient lens mounting apparatus of claim 6 wherein said coil spring with canted loops has its loops canted so as to axially urge said lens against said shoulder as said canted loops resiliently move toward their uncanted position.

8. The resilient lens mounting apparatus of claim 7 wherein said lock ring is a threaded ring threadedly engaged in said lens barrel.

9. A resilient lens mounting apparatus comprising:
   a lens barrel having a shoulder therein, said lens barrel having an axis;
   a lens within said lens barrel and engaged against said shoulder to locate said lens with respect to said lens barrel;
   a lock ring within said lens barrel and engaged with said lens barrel on the opposite side of said lens from said shoulder; and
   a substantially circular coil spring having canted loops resiliently engaged with said lens to position said lens with respect to said barrel, said coil spring having canted loops, said coil spring with canted loops engaging said lens to apply both axially and radially directed positioning forces to said lens in said lens mounting apparatus with respect to said optical axis.

10. The resilient lens mounting apparatus of claim 9 wherein said lock ring is a threaded ring threadedly engaged in said lens barrel.

11. A resilient optical element mounting apparatus comprising:

a barrel having an optical axis, a shoulder in said barrel;

an optical element having an optical axis lying on said optical axis of said barrel, said optical element being positioned within said barrel and engaging against said shoulder coaxially with said axis;

a retainer within said lens barrel;

a coiled resilient member with canted coils positioned between said retaining ring and said optical element, said coiled resilient member having its canted coils in the unstressed condition canted both radially and axially to urge said optical element with respect to said barrel both radially and axially against said shoulder.

12. The resilient optical element mounting apparatus of claim 11 wherein said resilient member with canted coils applies urging force to said optical element by resiliently moving toward the uncanted position.

13. The resilient optical element mounting apparatus of claim 11 wherein said retained is a ring threaded into said lens barrel.

14. The method of resiliently mounting an optical element comprising:

forming a barrel;

positioning an optical element having an optical axis within the barrel;

forming a resilient spring having canted coils into a substantially closed circle;

engaging the substantially circular resilient spring with canted coils against the optical element; and engaging a retaining ring against the resilient spring with canted coils so that the resilient spring with canted coils resiliently engages against the optical element to retain it within the lens barrel.

15. The method of claim 14 wherein the resilient spring with canted coils is positioned so that it applies axial force on the optical element.

16. The method of claim 15 wherein the resilient spring with canted coils is positioned so that it applies a radial force on the optical element.

17. The method of claim 14 wherein the resilient spring with canted coils is positioned within the barrel and against the optical element to apply both an axial and a radial positioning force on the optical element.

* * * * *